United States Patent
Gopalakrishnan et al.

(10) Patent No.: US 10,437,875 B2
(45) Date of Patent: Oct. 8, 2019

(54) MEDIA AFFINITY MANAGEMENT SYSTEM

(71) Applicant: International Business Machines Corporation, Armonk, NY (US)

(72) Inventors: Anand Gopalakrishnan, Cary, NC (US); Richard M. Haas, Wellesley, MA (US); Randy S. Johnson, O'Fallon, MO (US); Tedrick N. Northway, High Springs, FL (US); H. William Rinckel, Prospect, CT (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 15/363,581

(22) Filed: Nov. 29, 2016

(65) Prior Publication Data

US 2018/0150461 A1    May 31, 2018

(51) Int. Cl.
*G06F 17/30* (2006.01)
*G06F 16/435* (2019.01)
*G06F 16/438* (2019.01)

(52) U.S. Cl.
CPC .......... *G06F 16/436* (2019.01); *G06F 16/438* (2019.01)

(58) Field of Classification Search
CPC .......... G06F 17/2247; G06F 17/30032; G06F 17/3005; G06F 17/30858; G06F 17/30864; G06F 17/30867; G06F 17/30899; G06F 17/30935; G06F 16/436; G06F 16/438
USPC .................. 707/708, 715, 755, 758
See application file for complete search history.

(56) References Cited

U.S. PATENT DOCUMENTS

| | | | |
|---|---|---|---|
| 4,368,483 A | 1/1983 | Liu | |
| 5,764,306 A | 6/1998 | Steffano | |
| 6,463,205 B1 | 10/2002 | Aschbrenner et al. | |
| 7,334,249 B1 | 2/2008 | Byers | |
| 7,768,528 B1 | 8/2010 | Edwards et al. | |
| 8,135,724 B2 | 3/2012 | Smyers | |
| 2003/0007700 A1 | 1/2003 | Gutta et al. | |
| 2012/0005595 A1 | 1/2012 | Gavade et al. | |
| 2012/0154684 A1 | 6/2012 | Luo et al. | |
| 2016/0005064 A1* | 1/2016 | Pedroni | G06Q 30/0214 705/14.16 |
| 2016/0335339 A1* | 11/2016 | Venkataraman | G06F 17/30038 |

OTHER PUBLICATIONS

Chung-Hsien Wu et al., Emotion Recognition from Text Using Semantic Labels and Semantic Labels and Separable Mixture Models, ACM Transactions on Asian Language Information Processing, vol. 5, Issue 2, Jun. 2006, pp. 165-182 (Year: 2006).*
Akkiraju, "IBM Watson Tone Analyzer—New Service Now Available", IBM Developer Works, Jul. 16, 2015, 2 pages.

(Continued)

*Primary Examiner* — Greta L Robinson
(74) *Attorney, Agent, or Firm* — Yee & Associates, P.C.; Brian Restauro (57) ABSTRACT

A method, system, and computer program product for managing media. The method comprises a computer system. The computer system identifies a configurable media item in a media for a user. The computer system searches for a corresponding media item in a collection of media items for the user. The computer system replaces the configurable media item with the corresponding media item in the collection of media items.

20 Claims, 4 Drawing Sheets

(56) References Cited

OTHER PUBLICATIONS

Gratch, "Emotional Resonant Media: Advances in sensing, understanding and influencing human emotion through interactive media", The Routhledge Handbook on Emotions and Mass Media, copyright 2011, 18 pages.

* cited by examiner

MEDIA AFFINITY MANAGEMENT SYSTEM

BACKGROUND

1. Field

The disclosure relates generally to an improved computer system and, more specifically, to a method and apparatus for managing media content in a computer system. In particular, the disclosure relates to a method and apparatus of managing affinity in media content for a computer system.

2. Description of the Related Art

The Internet is a system of interconnected computer networks that use the Internet protocol suite (TCP/IP) to devices connected to the Internet. The different networks include closed, public, academic, business, and government works on a global scale. The connections may be wired, wireless, optical, or other suitable types of connections.

Users may access information on websites, communicate using email, voice, and exchange or obtain information through the Internet. For example, a user may view movies, web pages, or other content over the Internet. This content may be customized for the user. Web pages may include advertisements customized for a user based on websites visited by a user, or products viewed or purchased by a user. For example, a social media site may include content that shows products or services liked, purchased, or endorsed by friends of a user on the social media site.

Further, the content may be customized based on interests of the user. For example, advertisements for cars may be included in web pages for a user who views webpages from car sites. As another example, endorsements for a product from friends of a user may be included in a webpage for the user.

SUMMARY

An embodiment of the present disclosure provides for a method for managing media. The method comprises a computer system. The computer system identifies a configurable media item in a media for a user. The computer system searches for a corresponding media item in a collection of media items for the user. The computer system replaces the configurable media item with the corresponding media item in the collection of media items.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as the preferred method of use, further objectives and features thereof, will best be understood by reference to the following detailed description of an illustrative embodiment of the present disclosure when read in conjunction with the accompanying drawings, wherein:

DETAILED DESCRIPTION

The present invention may be a system, a method, and/or a computer program product. The computer program product may include a computer-readable storage medium or media, having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may be processed entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may process the computer-readable program instructions by utilizing state information of the computer-readable program instructions to customize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which are processed via the processor of the computer or other programmable data processing apparatus, create means for implementing the functions or acts specified in the flowchart and/or block diagram block or blocks. These computer-readable program instructions may also be stored in a computer-readable medium that can direct a computer, other programmable data processing apparatus, or other devices to function in a particular manner, such that the instructions stored in the computer-readable medium produce an article of manufacture including instructions which implement the function or act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other device implement the functions or acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more instructions for implementing the specified logical function or functions. In some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The illustrative embodiments recognize and take into account that it would be desirable to elicit different types of emotional responses from users viewing media. These emotional responses may be desirable to increase affinity to media. This increasing affinity for media may be desirable for various purposes, such as marketing or selling products and services. Further, the increase in affinity also may be desirable for increasing the positive view of an entity, such as a business or government agency.

Figure 1:
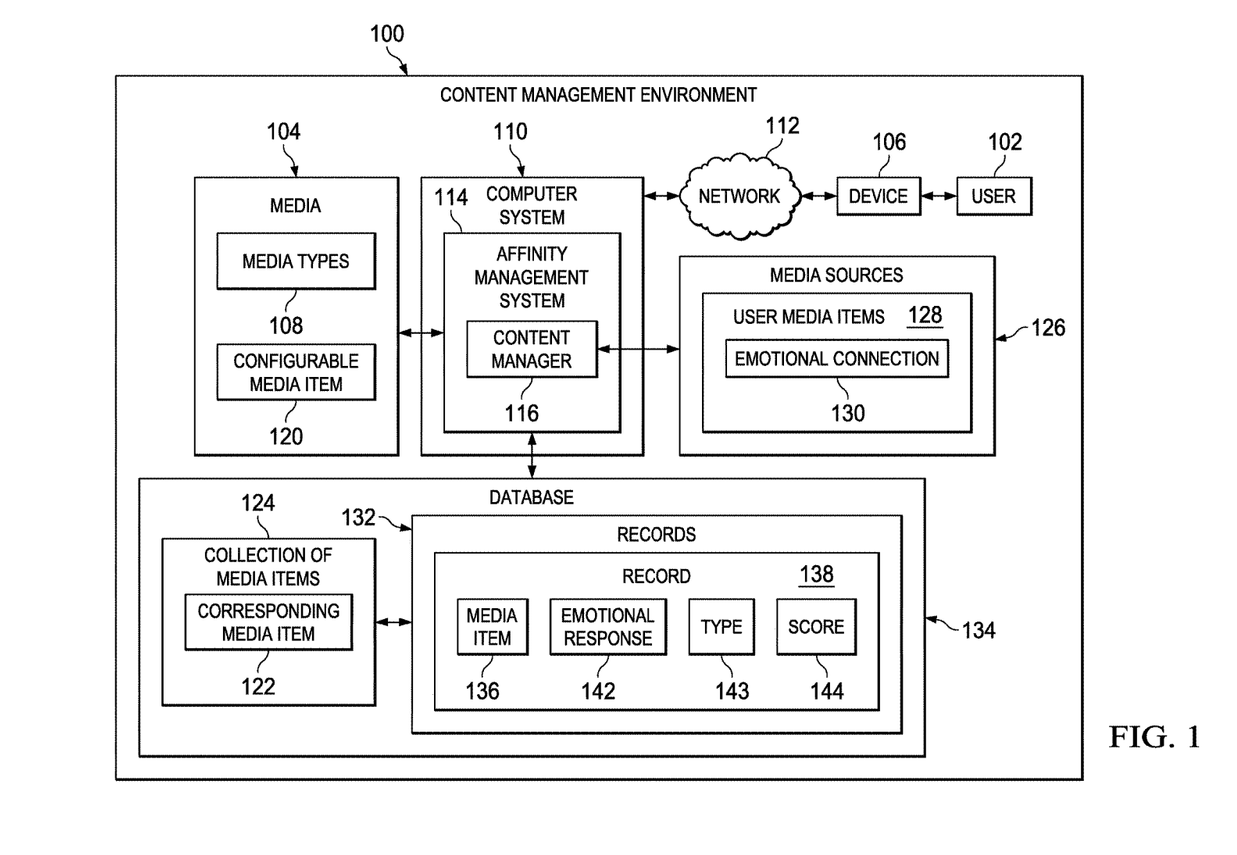
FIG. 1 is a block diagram of a content management environment in accordance with an illustrative embodiment.

With reference now to the figures and, in particular, with reference to FIG. 1, a block diagram of a content management environment is depicted in accordance with an illustrative embodiment. In this illustrative example, content management environment 100 is an example of an environment where user 102 may view media 104 using device 106.

As depicted, media 104 may take different forms. For example, media 104 may be a group of media types 108 that are selected from at least one of a video, an audio segment, a multimedia, an image, an animation, interactive content, or other suitable types of media. As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As depicted in this example, media 104 is stored, generated, or stored and generated in computer system 110. Computer system 110 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Media 104 is sent to device 106 via network 112. Both computer system 110 and device 106 are connected to network 112. Network 112 may be comprised of at least one of a local area network (LAN), a wide area network (WAN), an intranet, the Internet, of some other type of network. The connection to network 112 may be made using at least one of a wired connection, a wireless connection, an optical fiber, or some other suitable connection system.

Affinity management system 114 is located in computer system 110. In this illustrative example, affinity management system 114 operates to manage the affinity user 102 has to media 104 through managing the emotional response of user 102 to media 104. For example, affinity management system 114 operates to improve the emotional response that user 102 has to media 104.

In this illustrative example, content manager 116 is a component in affinity management system 114. Content manager 116 may be implemented in software, hardware, firmware or a combination thereof. When software is used, the operations performed by content manager 116 may be implemented in program code configured to run on hardware, such as a processor unit. When firmware is used, the operations performed by content manager 116 may be implemented in program code and data and stored in persistent memory to run on a processor unit. When hardware is employed, the hardware may include circuits that operate to perform the operations for content manager 116.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, content manager 116 is configured to manage media 104. For example, content manager 116 identifies configurable media item 120 in media 104 for user 102. Content manager 116 searches for corresponding media item 122 in collection of media items 124 for user 102. In the illustrative example, content manager 116 identifies media item matches for configurable media item 120 in collection of media items 124. As depicted, content manager 116 selects a media item match in a group of media items that most closely matches the desired emotional connection as corresponding media item 122.

Content manager 116 replaces configurable media item 120 with the corresponding item in collection of media items 124. In this illustrative example, configurable media item 120 has a media type selected from one of an image, a video, a sound, and some other type of media.

Content manager 116 may then send media 104 with corresponding media item 122 to device 106 for user 102. Device 106 presents media 104 using corresponding media item 122. In this manner, the affinity to media 104 by user 102 may be increased.

As depicted, collection of media items 124 is generated by content manager 116. For example, content manager 116 searches a group of media sources 126 for a group of user media items 128 with emotional connection 130 to user 102. As used herein, "a group of," when used with reference to items, means one or more items. For example, a group of media sources 126 is one or more of media sources 126. Content manager 116 stores the group of user media items 128 in collection of media items 124.

In one illustrative example, collection of media items 124 is stored in records 132 in database 134. For example, media item 136 in a group of user media items 128 is stored in record 138 in records 132 in database 134. As depicted, record 138 comprises media item 136, emotional response 142, type 143, and score 144 for emotional response 142.

Emotional response 142 is the emotional response that occurs when media item 136 is presented to user 102. This presentation may be, for example, at least one of visual, audio, or some other type of presentation. Emotional response 142 has type 143. For example, type 143 of emotional response 142 may be positive, neutral, happy, sad, annoyed, scared, or some other type of emotional response. Score 144 indicates the level of emotional response 142.

In one illustrative example, one or more technical solutions are present that overcome a technical problem with obtaining a desired affinity to media. As a result, one or more technical solutions may provide a technical effect in which the affinity to media is increased through using media items that elicit a desired emotional response to increase the affinity to the media.

As a result, content manager 116 in computer system 110 operates as a special purpose computer system in which content manager 116 in computer system 110 enables a listing of an emotional response based on selecting media items that are for a particular user. Content manager 116 does not select general media items but uses media items that have meaning to the user. In particular, content manager 116 transforms computer system 110 into a special purpose computer system, as compared to currently available general computer systems that do not have content manager 116.

In this manner, a movie, commercial, advertisement or other media have objects such as people, animals, and locations. A media item may be a particular portion of the video, an image, an audio segment, or other part of the media. With content manager 116, the actors and locations may be configurable media items that may be enhanced or replaced with corresponding media items for a user. The selection may be made to increase the affinity of the user to the media. For example, with content manager 116, an object in an immediate item may be replaced with another object that provides a desired emotional response.

In this manner, the media item may be customized for a particular user when presented to the user on a device for the user. For example, a movie may have media items that are replaced with those for which the user has an emotional connection. Images and sounds of people in the movie may be replaced with images and sounds of people that the user knows from real life. For example, a dog in a movie may be replaced with a dog that the offspring of a user has. As another example, the laughter of a young person in the movie may be replaced with the laughter of the offspring of the user. In yet another illustrative example, a car in an advertisement on a webpage may be replaced with a car owned by the user.

The illustration of content management environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, media 104 may have one or more configurable media items in addition to or in place of configurable media item 120 that may be replaced with a corresponding media item. Further, user 102 may have one or more devices in addition to device 106 for which media 104 may be sent for presentation. In another illustrative example, record 138 may include other fields in addition to or in place of the ones depicted in FIG. 1. For example, score 144 may be omitted. In other illustrative examples, more than one emotional response may be present, in place of or in addition, to emotional response 142. In yet another illustrative example, a categorization or identification of the type of media item may be included in record 138.

Figure 2:
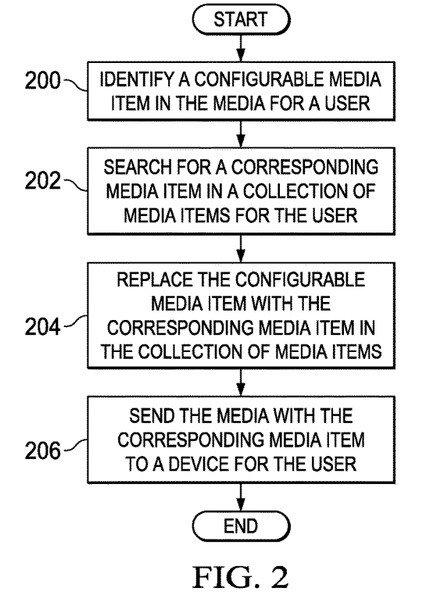
FIG. 2 is a high-level flowchart of a process for managing media in accordance with an illustrative embodiment.

Turning next to FIG. 2, a high-level flowchart of a process for managing media is depicted in accordance with an illustrative embodiment. The process illustrated in FIG. 2 is implemented in content manager 116 in FIG. 1 in this illustrative example. This process may be using at least one of hardware or program code. When program code is present, the program code may be used to provide instructions for a processor unit.

The process begins by identifying a configurable media item in the media for a user (step 200). The process searches for a corresponding media item in a collection of media items for the user (step 202).

The process replaces the configurable media item with the corresponding media item in the collection of media items (step 204). The replacement may occur in a number different ways. For example, the replacement may be performed using image replacement, or image replacement in a video. The original media item may be modified or edited to create the corresponding media item that replaces the media item originally present in the media. In other words, modifying or editing the media item results in the replacement of the media item with a corresponding media item in this example. The editing or modifying may include replacing faces in a video, images in a video, facial feature replacement, or other suitable types of editing.

The process sends the media with the corresponding media item to a device for the user (step 206). The process terminates thereafter. The device receiving the media presents the media using the corresponding item. The presentation may include at least one of display media, playing the media on an audio system, providing a tactile response, or some other suitable type of presentation.

Figure 3:
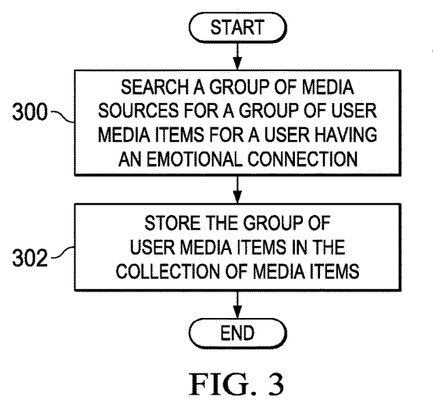
FIG. 3 is a high-level flowchart of a process for identifying emotional connections to media items for a user in accordance with illustrative embodiment.

With reference next to FIG. 3, a high-level flowchart of a process for identifying emotional connections to media items for a user is depicted in accordance with an illustrative embodiment. The process illustrated in FIG. 3 is implemented in content manager 116 in FIG. 1 in this illustrative example. This process may be using at least one of hardware or program code. When program code is present, the program code may be used to provide instructions for a processor unit.

The process begins by searching a group of media sources for a group of user media items for a user having an emotional connection (step 300). The group of media sources may be selected from at least one of a social media site, a device for the user, a cloud storage, or some other suitable type of source of media for the user. The media for the user is media that may include media items for which the user has an emotional connection. For example, the media may be photographs taken by the user, images for the user on a social network site, media including people, animals, or other objects for which the user has an emotional connection, or some other type of media.

The process identifies a corresponding media item in a collection of media items for the user; and a group of objects in a media item in the group of media items. The process stores the group of user media items in the collection of media items (step 302). The process terminates thereafter.

Figure 4:
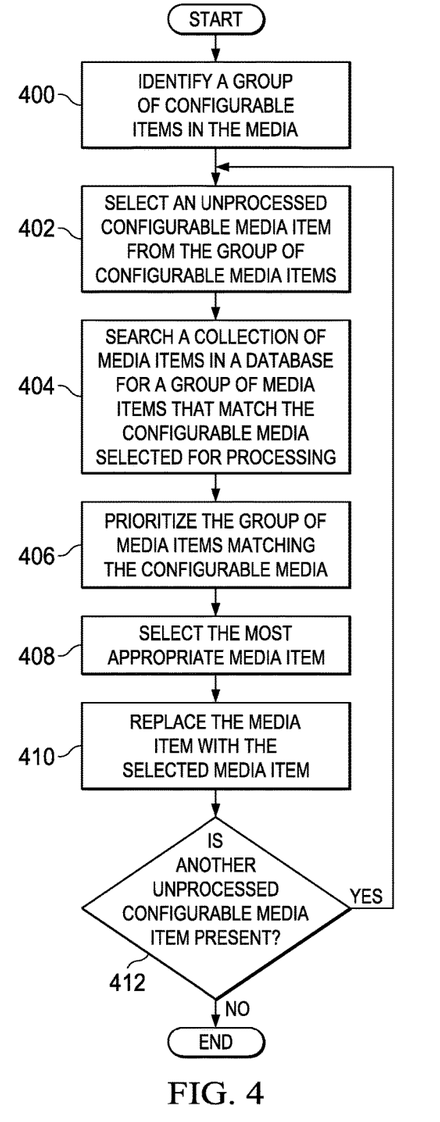
FIG. 4 is a flowchart of a process for replacing a configurable media item with a corresponding media item for a user in accordance with an illustrative embodiment.

With reference now to FIG. 4, a flowchart of a process for replacing a configurable media item with a corresponding media item for a user is depicted in accordance with an illustrative embodiment. The process illustrated in FIG. 4 is implemented in content manager 116 in FIG. 1 in this illustrative example. This process may be using at least one of hardware or program code. When program code is present, the program code may be used to provide instructions for a processor unit.

The process begins by identifying a group of configurable items in the media (step 400). The process selects an unprocessed configurable media item from the group of configurable media items (step 402). The process searches a collection of media items in a database for a group of media items that match the configurable media selected for processing (step 404). In step 404, the match may be identified in a number of different ways. For example, the match may be based on objects. For example, the search may be for an object such as a dog, a police officer, a soldier, a cat, a tree, a house, a field, or some other type of object.

The process then prioritizes the group of media items matching the configurable media (step 406). The priority may be based on the level of emotional connection that the user has with an object. For example, the priority may be based on a desired emotional connection. For example, if the object search is for a dog and the media includes the dog in a movie, the search may find Lassie, Sandy, and Frisky as objects in media items. These objects may be prioritized based on a level of emotional response. For example, each of the dogs may be assigned a score indicating the level of emotional response. The prioritization may be used to rank the dogs from highest to lowest in emotional response.

The process selects the most appropriate media item (step 408). In this example, the most appropriate media item may be the one having the highest level of emotional response when using the example of the three dogs. In other illustrative examples, the most appropriate media item may be based on the type of emotional response. For example, the type of emotional response may be selected from one of happy, sad, ambivalent, scared, angry, annoyed, or some other type of emotional response. For example, if the movie is looking for a happy emotional response, then the media item is selected from one that elicits a happy emotional response. Further, the same object in different media items may elicit different types of emotional responses.

The process replaces the media item with the selected media item (step 410).

The process then determines whether another unprocessed configurable media item is present (step 412). If another unprocessed configurable media item is present, the process returns to step 402 as described above. Otherwise, the process terminates.

Figure 5:
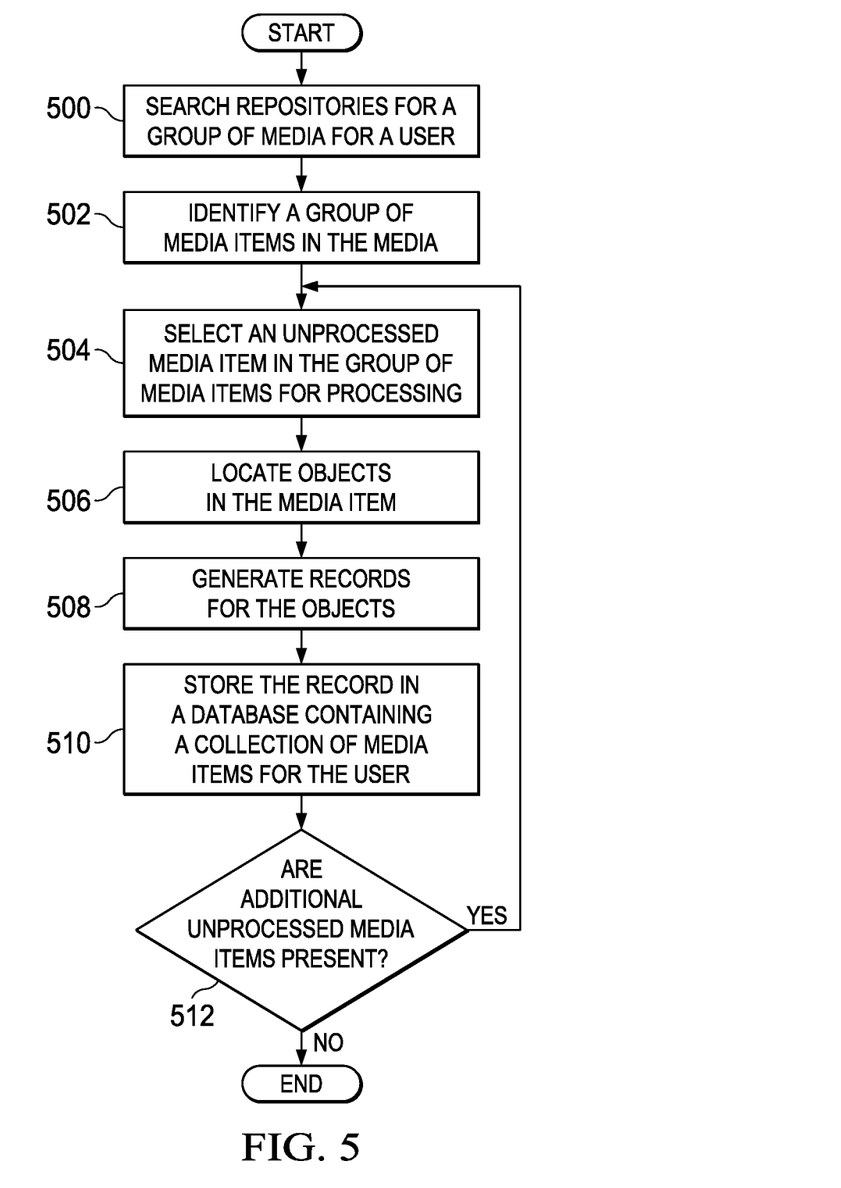
FIG. 5 is a flowchart of a process for identifying media items for a user in accordance with illustrative embodiment.

Turning to FIG. 5, a flowchart of a process for identifying media items for a user is depicted in accordance with illustrative embodiment. The process illustrated in FIG. 5 is implemented in content manager 116 in FIG. 1 in this illustrative example. This process may be using at least one of hardware or program code. When program code is present, the program code may be used to provide instructions for a processor unit.

The process begins by searching repositories for a group of media for a user (step 500). The process identifies a group of media items in the media (step 502). The process selects an unprocessed media item in the group of media items for processing (step 504). The process locates objects in the media item (step 506). The process then identifies the objects in the media item. An object may be, for example, a person, an animal, a dog, a location, a mouse, a building, a field or some other type of object. The process then identifies an emotional response to the objects in the media item. The emotional response may be, for example, a positive response, a negative response, or a neutral response. The positive response may be an emotional response in which the user has happy feelings when seeing the object in the media item. Additionally, the same object may elicit different responses in different media items. Additionally, the level of the emotional response may be identified, in addition to the type of emotional response.

For example, the dog in a media item may elicit a happy response when a media item shows that the dog is behaving. In another example, the same dog may elicit an unhappy response if the dog is shown in the media item as having destroyed a pair of shoes belonging to the user. In another example, the same dog may elicit a happy response in three different media items with different levels of emotional response. In other examples, different dogs in the media items may elicit different levels of emotional response from the user.

The process then generates records for the objects (step 508). In this illustrative example, a record may be created for each object and each record includes an identification of the object, the media item, the emotional response, and a value for the emotional response. The process then stores the records in a database containing a collection of media items for the user (step 510). A determination is made as to whether additional unprocessed media items are present (step 512). If additional unprocessed media items are present, the process returns to step 504. Otherwise, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 6:
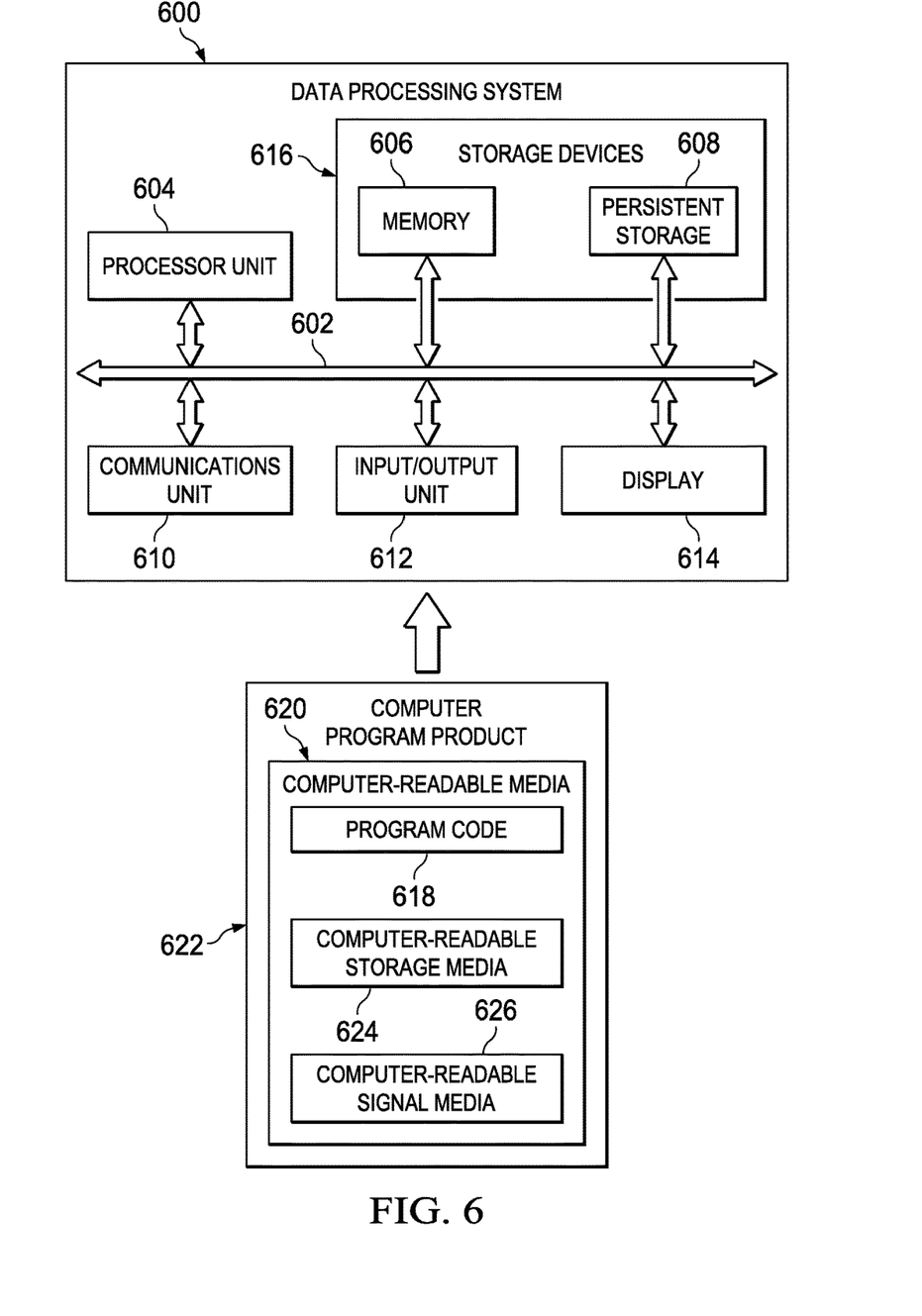
FIG. 6 is a block diagram of a data processing system in accordance with an illustrative embodiment.

Turning now to FIG. 6, a block diagram of a data processing system is depicted in accordance with an illustrative embodiment. Data processing system 600 may be used to implement computer system 110 and device 106 of FIG. 1. In this illustrative example, data processing system 600 includes communications framework 602, which provides communications between processor unit 604, memory 606, persistent storage 608, communications unit 610, input/output unit 612, and display 614. In this example, communication framework 602 may take the form of a bus system.

Processor unit 604 serves to process instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a solid state hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer-usable program code, or computer-readable program code that may be read and processed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for processing by processor unit 604. Program code 618 and computer-readable media 620 form computer program product 622 in these illustrative examples. In one example, computer-readable media 620 may be computer-readable storage media 624 or computer-readable signal media 626.

In these illustrative examples, computer-readable storage media 624 is a physical or tangible storage device used to store program code 618 rather than a medium that propagates or transmits program code 618. Alternatively, program code 618 may be transferred to data processing system 600 using computer-readable signal media 626. Computer-readable signal media 626 may be, for example, a propagated data signal containing program code 618. For example, computer-readable signal media 626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

Thus, the illustrative embodiments of the present invention provide a computer implemented method, computer system, and computer program product for managing media. A process identifies a configurable media item in the media for a user. A corresponding media item is searched for in a collection of media items for the user. The configurable media item is replaced with the corresponding media item in the collection of media items.

The content manager in one or more illustrative examples may be used to provide affinity for entertainment, such as movies. In another illustrative example, a content manager may be used to enhance affinity to other types of media, such as educational media used for teaching children to help them more effectively learn. In yet another example, the content manager may be used to increase affinity to do-it-yourself training videos.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more instructions for implementing the specified logical function or function. It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing media, the method comprising:
    identifying, by a computer system, a configurable media item in a media for a user;
    searching, by the computer system, for a corresponding media item in a collection of media items for the user;
    selecting, by the computer system, the corresponding media item in the collection of media items that most closely matches a desired emotional connection to the configurable media item according to a type of emotional response of the corresponding media item and according to a level of emotional response of the corresponding media item; and
    replacing, by the computer system, the configurable media item with the corresponding media item in the collection of media items.

2. The method of claim 1 further comprising:
    presenting, by a device, the media using the corresponding media item.

3. The method of claim 1, wherein searching, by the computer system, for the corresponding media item in the collection of media items for the user comprises:
    identifying, by the computer system, media item matches for the configurable media item in the collection of media items; and
    prioritizing, by the computer system, the media item matches based on a desired emotional connection for the configurable media item.

4. The method of claim 1 further comprising:
    sending, by the computer system, the media with the corresponding media item to a device for the user.

5. The method of claim 1 further comprising:
    searching, by the computer system, a group of media sources for a group of user media items for the user having an emotional connection; and
    storing, by the computer system, the group of user media items in the collection of media items.

6. The method of claim 1, wherein the collection of media items is stored in a database.

7. The method of claim 6, wherein a media item in the collection of media items is stored in a record in the database in which the record comprises the media item, an emotional response, and a score for the emotional response.

8. The method of claim 1, wherein the configurable media item has a media type selected from one of an image, a video, and a sound.

9. A computer system comprising:
    a processor unit;
    a content manager that identifies a configurable media item in a media for a user; searches for a corresponding media item in a collection of media items for the user; and replaces the configurable media item with the corresponding media item in the collection of media items, wherein the corresponding media item is selected according to a type of emotional response of the corresponding media item and according to a level of emotional response of the corresponding media item.

10. The computer system of claim 9, wherein the content manager presents the media using the corresponding media item.

11. The computer system claim 9, wherein the searching comprises:
    identifying media item matches for the configurable media item in the collection of media items;

prioritizing the media item matches based on a desired emotional connection for the configurable media item; and selecting a media item match in a group of media items that most closely matches the desired emotional connection as the corresponding media item.

12. The computer system of claim 9, wherein the content manager sends the media with the corresponding media item to a device for the user.

13. The computer system of claim 9, wherein the content manager searches a group of media sources for a group of user media items for the user; identifies an emotional connection to the user for each media item in a group of user media items; and stores each media item in the collection of media items.

14. The computer system of claim 9, wherein a media item in the collection of media items is stored as a record in a database in which the record comprises where an object in the media item is located, an emotional response, and a score for the emotional response.

15. The computer system claim 9, wherein a media item in the collection of media items is stored in a record in a database in which the record comprises the media item, an emotional response, and a score for the emotional response.

16. The computer system claim 9, wherein the configurable media item has a media type selected from one of an image, a video, and a sound.

17. A computer program product for managing media, the computer program product comprising:
a computer-readable storage media;
first program code, stored on the computer-readable storage media, for identifying a configurable media item in a media for a user;
second program code, stored on the computer-readable storage media, for searching for a corresponding media item in a collection of media items for the user; and
third program code, stored on the computer-readable storage media, for replacing the configurable media item with the corresponding media item in the collection of media items, wherein the corresponding media item is selected according to a type of emotional response of the corresponding media item and according to a level of emotional response of the corresponding media item.

18. The computer program product of claim 17, wherein the second program code comprises:
program code, stored on the computer-readable storage media, for identifying media item matches for the configurable media item in the collection of media items;
program code, stored on the computer-readable storage media, for prioritizing the media item matches based on a desired emotional connection for the configurable media item; and
program code, stored on the computer-readable storage media, for selecting a media item match in a group of media items that most closely matches the desired emotional connection as the corresponding media item.

19. The computer program product of claim 17 further comprising:
fourth program code, stored on the computer-readable storage media, for sending the media with the corresponding media item to a device for the user.

20. The computer program product of claim 17 further comprising:
a fourth program code, stored on the computer-readable storage media, for searching a group of media sources for a group of user media items for the user;
fifth program code, stored on the computer-readable storage media, for identifying an emotional connection to the user for each user media item in the group of user media items; and
sixth program code, stored on the computer-readable storage media, for storing each media item in the collection of media items.

* * * * *